United States Patent
Yang et al.

(10) Patent No.: US 9,558,167 B2
(45) Date of Patent: Jan. 31, 2017

(54) METHOD, SYSTEM AND WEB SERVER FOR ADDING RELATED MICROBLOGS ON WEBPAGE

(71) Applicant: Tencent Technology (Shenzhen) Company Limited, Shenzhen, Guangdong (CN)

(72) Inventors: Baodong Yang, Shenzhen (CN); Lin Zhao, Shenzhen (CN); Han Li, Shenzhen (CN); Xiangbo Wu, Shenzhen (CN); Lei Wei, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 583 days.

(21) Appl. No.: 14/052,733

(22) Filed: Oct. 12, 2013

(65) Prior Publication Data

US 2014/0068418 A1 Mar. 6, 2014

Related U.S. Application Data

(63) Continuation of application No. PCT/CN2012/076539, filed on Jun. 6, 2012.

(30) Foreign Application Priority Data

Sep. 13, 2011 (CN) .......................... 2011 1 0269171

(51) Int. Cl.
*G06F 17/24* (2006.01)
*G06F 17/30* (2006.01)

(52) U.S. Cl.
CPC .......... *G06F 17/24* (2013.01); *G06F 17/3089* (2013.01)

(58) Field of Classification Search
CPC ............................ G06F 17/24; G06F 17/3089
See application file for complete search history.

(56) References Cited

U.S. PATENT DOCUMENTS

2007/0067319 A1 3/2007 Chang
2007/0214097 A1 9/2007 Parsons
(Continued)

FOREIGN PATENT DOCUMENTS

CN 1841371 A 10/2006
CN 1845545 A 10/2006
(Continued)

OTHER PUBLICATIONS

Notification of the Second Office Action of Chinese application No. 201110269171.0, issued on Jul. 9, 2015.
(Continued)

*Primary Examiner* — Scott Baderman
*Assistant Examiner* — Seung Jung
(74) *Attorney, Agent, or Firm* — Oppedahl Patent Law Firm LLC

(57) ABSTRACT

Disclosed in the present disclosure is a method for adding related microblogs on webpage. The method comprises: extracting keywords from web content of a webpage; acquiring the microblog information related to the web content of the webpage according to the keyword; and adding and displaying microblog information on the webpage. Disclosed in the present disclosure also is a system and web server for adding related microblogs on a webpage. The present disclosure enables the user to acquire the latest microblog information related to a webpage, and perform related operations on microblogs when the user is browsing the webpage, and thereby improving the user experience and the utilization of network resources.

4 Claims, 2 Drawing Sheets

(56) References Cited

U.S. PATENT DOCUMENTS

| | | | |
|---|---|---|---|
| 2009/0276500 A1 | 11/2009 | Karmarkar | |
| 2011/0055723 A1 | 3/2011 | Lightstone | |
| 2012/0005224 A1* | 1/2012 | Ahrens | G06Q 10/10 |
| | | | 707/769 |
| 2012/0096046 A1* | 4/2012 | Kucera | G06F 17/3089 |
| | | | 707/802 |
| 2012/0131112 A1* | 5/2012 | Yehaskel | G06F 17/30864 |
| | | | 709/206 |

FOREIGN PATENT DOCUMENTS

| | | | |
|---|---|---|---|
| CN | 101004739 A | 7/2007 |
| CN | 101042709 A | 9/2007 |
| CN | 101950289 A | 1/2011 |
| CN | 102158536 A | 8/2011 |
| CN | 102164170 A | 8/2011 |

OTHER PUBLICATIONS

URL:http://web.archive.org/web/20110714001905/http://sports.sina.com.cn/nba/ : issued on Jul. 14, 2011; SINA, SINA Sports Storm—NBA [online]; pp. 1-3.
SINA Sports Storm—NBA[online], Jul. 14, 2011.
International Search Report in international application No. PCT/CN2012/076539, mailed on Oct. 18, 2012.
English Translation of the Written Opinion of the International Search Authority in international application No. PCT/CN2012/076539, mailed on Oct. 18, 2012.
Notification of the First Office Action of Chinese application No. 201110269171.0 , issued on Jan. 28, 2015.

\* cited by examiner

METHOD, SYSTEM AND WEB SERVER FOR ADDING RELATED MICROBLOGS ON WEBPAGE

CROSS REFERENCE TO RELATED APPLICATIONS

This is a continuation application of International Patent Application No.: PCT/CN2012/076539, filed on Jun. 6, 2012, which claims priority to Chinese Patent Application No.: 201110269171.0 filed on Sep. 13, 2011, the disclosure of which is incorporated by reference herein in its entirety.

TECHNICAL FIELD

The present disclosure relates to techniques of webpage development, and in particular to a method, system, and web server for adding a related microblogs on a webpage.

BACKGROUND

A Microblog is a micro blog widely applied at present. In view of the media nature of the microblog, a web portal starts to combine the webpage with the microblog gradually, so as to bring the advantages of both into full play and facilitate information dissemination.

At present, the combination of the webpage and the microblog in the web portal is mainly shown in addition of related microblog user information in the webpage. Specifically, a predetermined microblog user list, an operational key for adding a microblog user as a microblog friend, and an operational key for registering as a microblog user are displayed in the webpage. However, multiple webpages of one channel in the web portal often designate the same microblog user list, and the microblog user information displayed on the webpage will not change correspondingly when the web content of the webpage changes. Therefore, a lack of correlation is shown between the web content of the webpage and the information of the microblog user in the displayed microblog user list. As a result, a user pays no attention to the displayed microblog user list when browsing the web, which not only reduces user experience, but also hinders dissemination of related microblog information, and fails to combine the webpage and the microblog effectively.

SUMMARY

In view of the above, the present disclosure provides a method, system and, web server for adding a related microblog on a webpage which realizes the effective combination of the webpage and the microblog and improves the utilization of network resources.

Therefore, the technical solution of the present disclosure is implemented as follows:

The present disclosure provides a method for adding a related microblog on a webpage. The method comprises:

extracting a keyword for the web content of a current webpage;

acquiring microblog information related to the web content of the current webpage according to the keyword; and adding and displaying the microblog information on the webpage.

In the above solution, the step of acquiring microblog information related to the web content of the current webpage according to the keyword may comprise:

acquiring, by a web server of the webpage, the microblog information containing the keyword from a microblog web server according to the keyword.

In the aforementioned solution, the step of acquiring, by a web server of the webpage, the microblog information containing the keyword from a microblog web server according to the keyword may comprise:

sending, by the web server, the keyword to the microblog web server; and searching, by the microblog web server, for the microblog information containing the keyword, and sending the found microblog information to the web server.

In the aforementioned solution, the step of adding and displaying the microblog information on the webpage may comprise:

adding and displaying microblog user information and a microblog message contained in the microblog information on the webpage.

In the aforementioned solution, the step of adding and displaying the microblog information on the webpage may further comprise:

adding an operational key for forwarding the microblog message and/or an operational key for adding a microblog user as a microblog friend on the webpage.

The present disclosure further provides a web server including an extracting unit, an acquiring unit, and a displaying unit, wherein the extracting unit is configured to extract a keyword for the web content of a current webpage;

the acquiring unit is configured to acquire microblog information related to the web content of the current webpage according to the keyword extracted by the extracting unit; and the displaying unit is configured to add and display the microblog information acquired by the acquiring unit on the webpage.

In the aforementioned solution, the acquiring unit may be configured to acquire the microblog information containing the keyword from a microblog web server according to the keyword extracted by the extracting unit.

In the aforementioned solution, the acquiring unit may be configured to send the keyword extracted by the extracting unit to the microblog web server, and receive the microblog information containing the keyword sent by the microblog web server.

In the aforementioned solution, the displaying unit may be configured to add and display microblog user information and a microblog message contained in the microblog information acquired by the acquiring unit on the webpage.

In the aforementioned solution, the displaying unit may be further configured to add an operational key for forwarding the displayed microblog message and/or an operational key for adding a microblog user as a microblog friend on the webpage.

The present disclosure further provides a system for adding a related microblog on a webpage. The system comprises a microblog web server and the aforementioned web server, wherein the microblog web server is configured to provide microblog information.

In the aforementioned solution, the microblog web server may be further configured to receive a keyword sent by an acquiring unit of the web server, search for the microblog information containing the keyword, and send the found microblog information to the acquiring unit of the web server.

The present disclosure provides a method, system, and web server for adding a related microblog on a webpage, wherein by extracting the keyword for the web content of the webpage, the web server acquires the microblog information related to the web content of the webpage, adds the microblog information on the webpage, and displays it to the user, such that the user can acquire the latest microblog information related to the current webpage when the user is browsing webpages, thus improving the user experience and the utilization of network resources.

In addition, an operational key for forwarding the microblog message and/or an operational key for adding a microblog user as a microblog friend are added on the webpage in the present disclosure, enabling the user to perform a related operation on the microblog when the user is browsing the webpage, and thereby improving the user experience and the utilization of network resources.

DETAILED DESCRIPTION

The basic idea of the disclosure is that: a web server acquires microblog information associated with web content of a webpage, and displays the microblog information on the webpage. Thus, the microblog and the webpage are better combined, enabling the user to acquire the latest microblog messages related to the web content of the webpage as well as to perform a related operation on the microblog when the user is browsing the webpage, thereby improving the user experience and the utilization of network resources.

Figure 1:
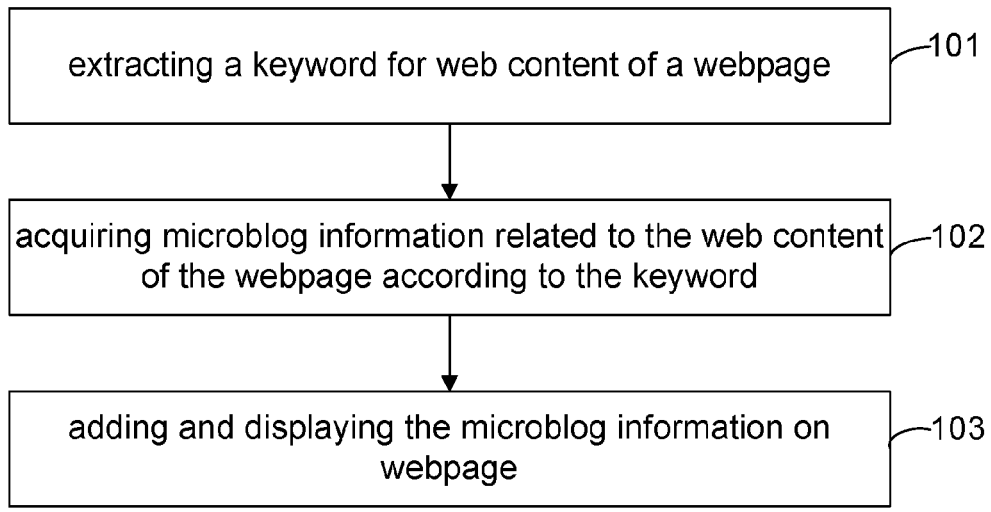
FIG. 1 is a flowchart illustrating a method for adding a related microblog on a webpage according to the present disclosure.

As shown in FIG. 1, the method for adding a related microblog on a webpage according to the present disclosure mainly comprises the following steps:

Step 101: extracting a keyword for web content of a webpage;

Step 102: acquiring microblog information related to the web content of the webpage according to the keyword;

Here, a web server of the webpage acquires the microblog information including the keyword from a microblog web server according to the keyword.

Specifically, the web server sends the keyword to the microblog web server; and the microblog web server searches for the microblog information containing the keyword, and sends the searched microblog information to the web server.

Step 103: adding and displaying the microblog information on the webpage.

Specifically, messages and user information related to the microblog information are added and displayed on the webpage.

In addition, an operational key for forwarding the microblog messages and/or an operational key for adding a microblog user as a microblog good friend in microblog may be added on the webpage.

Accordingly, the present disclosure also provides a web server configured to add a related microblog on a webpage. The web server comprises an extracting unit, an acquiring unit, and a displaying unit, wherein the extracting unit is configured to extract a keyword for web content of a webpage; the acquiring unit is configured to acquire microblog information related to the web content of the webpage according to the keyword extracted by the extracting unit; and the displaying unit is configured to add and display the microblog information acquired by the acquiring unit on the webpage.

The acquiring unit is configured to acquire the microblog information comprising the keyword from a microblog web server according to the keyword extracted by the extracting unit. Specifically, the acquiring unit is configured to send the keyword extracted by the extracting unit to the microblog web server, and receive the microblog information comprising the keyword sent by the microblog web server.

Wherein the displaying unit is configured to add and display messages and user information related to the microblog information on the webpage. Here, the displaying unit may be further configured to add an operational key on the webpage for forwarding the displayed microblog messages and/or add an operational key on the webpage for adding a microblog user as a microblog good friend in microblog on the webpage.

In addition, the present disclosure also provides a system for adding a related microblog on a webpage. The system comprises a microblog web server and the web server as described above. The microblog web server is configured to provide microblog information.

Specifically, the microblog web server is configured to receive a keyword sent by an acquiring unit of the web server of the webpage, search for the microblog information comprising the keyword, and send the searched microblog information to the acquiring unit of the web server of the webpage.

Embodiment 1

In this embodiment, the implementation for adding a related microblog in a webpage is illustrated in detail with the example of a news webpage.

Figure 2:
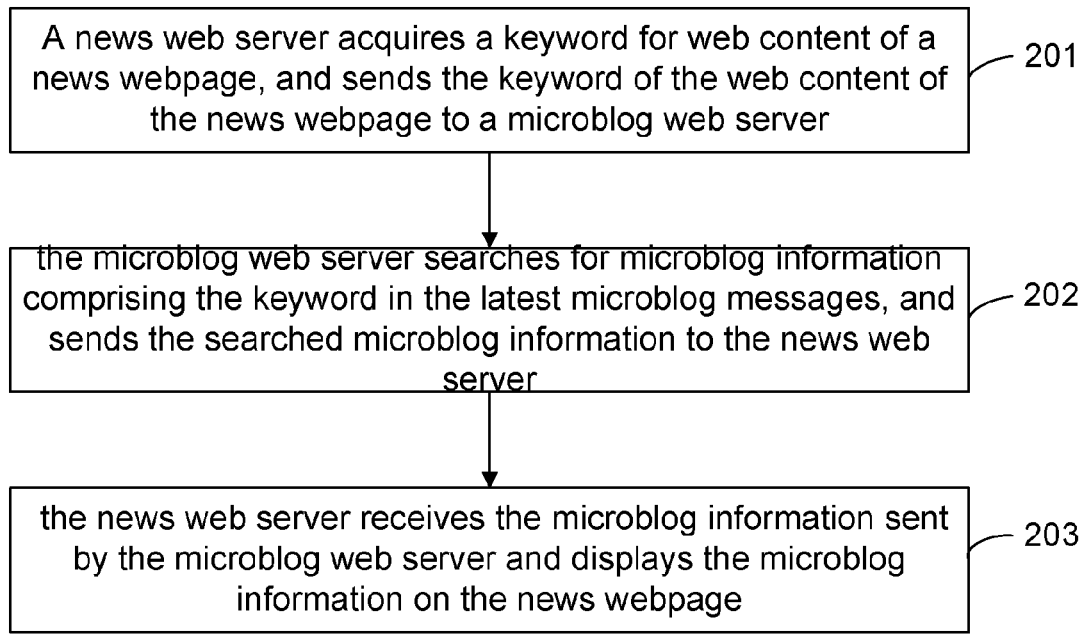
FIG. 2 is a flowchart for adding a related microblog on a news webpage in embodiment 1 of the present disclosure.

As shown in FIG. 2, the specific implementation for adding the related microblog in the news webpage may comprise:

Step 201: a news web server performs word segmentation processing and statistical analysis on web content of a news webpage to acquire a keyword of the web content of the news webpage, and sends the keyword of the web content of the news webpage to a microblog web server;

Here, the keyword may be a preset specific word, or may be set to be a word whose frequency of occurrence is relatively high or exceeds a preset frequency threshold value after the word segmentation processing is performed on the web content of the news webpage.

Wherein there may be one or more keywords.

Step 202: the microblog web server searches for microblog information comprising the keyword in the latest microblog messages, and sends the searched microblog information to the news web server;

The microblog information may comprise a microblog message released by a microblog user and information of the microblog user who released the microblog message. The information of the microblog user comprises information such as a username of the microblog user.

Here, a time period for defining a search scope of the microblog information may be preset in the microblog web server. The microblog web server searches all microblog information released in the preset period for the microblog information containing the keyword.

Here, if there is more than one keyword, the microblog web server sends the microblog information comprising the largest number of keywords in the searched microblog information to the news web server.

Step 203: the news web server receives the microblog information sent by the microblog web server and displays the microblog information on the news webpage.

Here, the news web server may also display an operational key on the webpage for forwarding the microblog message and/or add an operational key on the webpage for adding a microblog user as a microblog good friend in the microblog on the news webpage.

Figure 3:
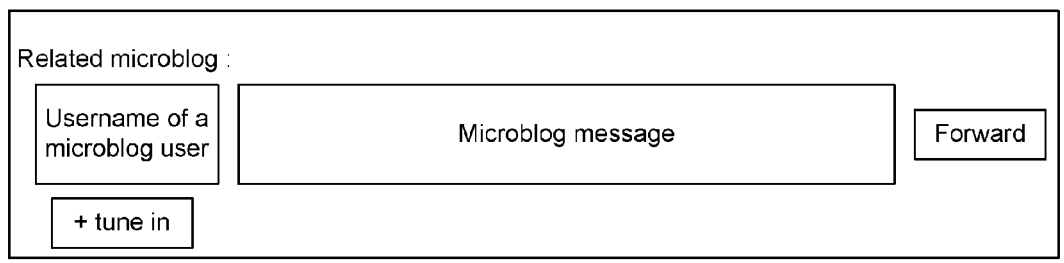
FIG. 3 is a schematic diagram illustrating a part of a news webpage after adding a related microblog according to embodiment 1 of the present disclosure.

For example, as shown in FIG. 3, the news web server may adopt an existing microblog displaying mode to display a microblog related to the web content of the news webpage on the news webpage. Specifically, the microblog message of the microblog, the username of the microblog user, the operational key "forward" for forwarding the microblog messages, and the operational key "+ tune in" for adding the microblog user as a microblog good friend are displayed.

Those ordinarily skilled in the art would appreciate that the above steps or units may be implemented by one or more processors with computer program running thereon. The computer program can be stored in a non-transitory computer-readable storage medium. When the computer program is executed, the above steps or units can be included. The storage medium can be a disk, a compact disk, a Read-Only Memory (ROM), a Random Access Memory (RAM) or the like.

The above is only the preferred embodiment of the present disclosure and not intended to limit the scope of the present disclosure.

The invention claimed is:

1. A method for adding a related microblog on a webpage, comprising:
    extracting a keyword for web content of a webpage, wherein the keyword is a word whose frequency of occurrence exceeds a preset frequency threshold value after word segmentation processing is performed on the web content of the webpage;
    acquiring microblog information related to the web content of the webpage according to the keyword; and
    adding and displaying the microblog information on the webpage;
    wherein the keyword is a word whose frequency of occurrence exceeds a preset frequency threshold value after word segmentation processing is performed on the web content of the webpage;
    wherein the step of adding and displaying the microblog information on the webpage comprises: adding and displaying messages and user information related to the microblog information on the webpage; and
    wherein the step of adding and displaying the microblog information on the webpage further comprises: adding an operational key on the webpage for forwarding microblog messages and adding an operational key on the webpage for adding a microblog user as a good friend in microblog on the webpage;
    wherein the step of acquiring microblog information related to the web content of the webpage according to the keyword comprises:
    acquiring, by a web server of the webpage, the microblog information comprising the keyword from a microblog web server according to the keyword; and
    wherein the step of acquiring, by a web server of the webpage, the microblog information comprising the keyword from a microblog web server according to the keyword comprises:
    sending, by the web server of the webpage, the keyword to the microblog web server for searching the microblog information comprising the keyword; and
    receiving, by the web server of the webpage, the searched microblog information upon the condition that the microblog information comprising the keyword is searched.

2. A web server comprising:
    one or more hardware processors; and
    a plurality of program modules stored in a non-transitory computer-readable medium, when, executed by the one or more hardware processors, cause the web server to perform predefined functions, the plurality of program modules further comprising an extracting unit, an acquiring unit, and a displaying unit, wherein the extracting unit is configured to extract a keyword for web content of a webpage;
    wherein the keyword is a word whose frequency of occurrence exceeds a preset frequency threshold value after word segmentation processing is performed on the web content of the webpage;
    the acquiring unit is configured to acquire microblog information related to the web content of the webpage according to the keyword extracted by the extracting unit; and
    the displaying unit is configured to add and display the microblog information acquired by the acquiring unit on the webpage;
    wherein the displaying unit is configured to add and display messages and user information related to the microblog information on the webpage; and
    wherein the displaying unit is further configured to add an operational key on the
    webpage for forwarding the displayed microblog messages and add an operational key on the webpage for adding a microblog user as a microblog good friend in microblog on the webpage;
    wherein the acquiring unit is configured to acquire the microblog information comprising the keyword from a microblog web server according to the keyword extracted by the extracting unit; and
    wherein the acquiring unit is configured to send the keyword extracted by the extracting unit to the microblog web server, and receive the microblog information comprising the keyword sent by the microblog web server.

3. A system for adding a related microblog on a webpage, comprising a microblog web server and the web server according to claim 2, wherein the microblog web server is configured to provide microblog information.

4. The system for adding a related microblog on a webpage according to claim 3, wherein the microblog web server is further configured to receive a keyword sent by an acquiring unit of the web server of the webpage, search for the microblog information comprising the keyword, and send the searched microblog information to the acquiring unit of the web server of the webpage.

* * * * *